United States Patent
Shimizu et al.

(10) Patent No.: US 9,067,157 B2
(45) Date of Patent: Jun. 30, 2015

(54) VEHICLE HAVING ONE OR MORE FUEL FILTERS ATTACHED TO A LOCATION OTHER THAN THE ENGINE

(71) Applicant: ISEKI & CO., LTD., Ehime-ken (JP)

(72) Inventors: Akihiro Shimizu, Ehime-ken (JP);
Taketoshi Fujita, Ehime-ken (JP);
Yoshihisa Tsuzuki, Ehime-ken (JP);
Tomohiro Igaue, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 0 days.

(21) Appl. No.: 14/288,615

(22) Filed: May 28, 2014

(65) Prior Publication Data
US 2014/0353058 A1 Dec. 4, 2014

(30) Foreign Application Priority Data
May 30, 2013 (JP) .................................. 2013-114444

(51) Int. Cl.
*B60K 15/00* (2006.01)
*B01D 35/02* (2006.01)

(52) U.S. Cl.
CPC ...................................... *B01D 35/02* (2013.01)

(58) Field of Classification Search
USPC .................... 180/69.4–69.5; 903/905, 908
See application file for complete search history.

(56) References Cited

U.S. PATENT DOCUMENTS

2013/0173123 A1* 7/2013 Oouchida et al. ............... 701/50

FOREIGN PATENT DOCUMENTS

| GB | 2 452 928 | 3/2009 |
| JP | 2011-47773 | 3/2011 |

OTHER PUBLICATIONS

First Examination Report issued Jun. 16, 2014 in corresponding New Zealand Application No. 625554.

* cited by examiner

*Primary Examiner* — John Walters
*Assistant Examiner* — James Triggs
(74) *Attorney, Agent, or Firm* — Wenderoth, Lind & Ponack, L.L.P.

(57) ABSTRACT

A vehicle, including: one or more fuel filters through which fuel that is supplied from one or more fuel tanks to an engine is to pass; and an operating seat in which a worker is to perform operation for activating the vehicle and a working implement that is installed on the vehicle, wherein the one or more fuel tanks are arranged at a position which is placed below a floor-face the operating seat has, the engine is arranged at a position which is placed in front of the operating seat with respect to a forward movement direction of a vehicle main body, and the one or more fuel filters are arranged at a position which is placed at a right side or a left side of the one or more fuel tanks with respect to the forward movement direction of the vehicle main body.

2 Claims, 11 Drawing Sheets

VEHICLE HAVING ONE OR MORE FUEL FILTERS ATTACHED TO A LOCATION OTHER THAN THE ENGINE

BACKGROUND OF THE INVENTION

1. Field of the Invention

The present invention relates to a vehicle such as a work vehicle and so forth like a vehicle for agriculture such as a tractor and so forth.

2. Related Art of the Invention

A work vehicle like a vehicle for agriculture such as a tractor and so forth comprises an engine for driving the wheels.

And, a configuration is known in which electric component products and an engine control unit are attached to the engine like that (for example, see Japanese Patent Application Publication No. 2011-47773).

SUMMARY OF THE INVENTION

Now, a common rail type engine, which uniformly supplies to the respective injectors fuel that has been highly pressurized, is getting widely adopted also for a work vehicle.

The present inventors consider that, regarding a common rail type engine like that, mounting of two fuel filters, that is, a pre-filter and a main filter is ideal.

However, the present inventors have noticed that, in a common rail type engine to which many electric component products are attached, there does not exist sufficient space for attaching two fuel filters to the engine.

The present invention, in consideration of the above-described conventional problems, furnishes a vehicle which is able to realize attachment of one or more fuel filters to a location other than the engine.

The 1$^{st}$ aspect of the present invention is a vehicle, comprising:

one or more fuel filters through which fuel that is supplied from one or more fuel tanks to an engine is to pass; and an operating seat in which a worker is to perform operation for activating the vehicle and a working implement that is installed on the vehicle, wherein the one or more fuel tanks are arranged at a position which is placed below a floor-face the operating seat has, the engine is arranged at a position which is placed in front of the operating seat with respect to a forward movement direction of a vehicle main body, and the one or more fuel filters are arranged at a position which is placed at a right side or a left side of the one or more fuel tanks with respect to the forward movement direction of the vehicle main body.

By means of this, since the one or more fuel filters are arranged at a right side or a left side of the one or more fuel tanks, with vacant space being exploited, attachment of the one or more fuel filters to a location other than the engine becomes able to be realized.

In addition, by means of this, since the one or more fuel tanks are arranged below the floor-face the operating seat has, with vacant space being exploited, the one or more fuel tanks become able to be attached.

The 2$^{nd}$ aspect of the present invention is a vehicle according to the 1$^{st}$ aspect of the present invention, comprising a step for the worker getting into the operating seat, wherein the step is arranged at least at a side where the one or more fuel filters are positioned, and the one or more fuel filters are arranged at a position which is placed in front of the step with respect to the forward movement direction of the vehicle main body.

By means of this, since the one or more fuel filters are arranged at a front side of the step, with vacant space being exploited, attachment of the one or more fuel filters to a location other than the engine becomes able to be realized.

The 3$^{rd}$ aspect of the present invention is a vehicle according to the 1$^{st}$ aspect of the present invention, wherein the one or more fuel filters are covered by a cover on which an attaching part of one or more oil pressure hoses for activating a front loader is provided.

By means of this, since the attaching part of the one or more oil pressure hoses for activating the front loader is provided on the cover which covers the one or more fuel filters, the structure of the cover is used, and the number of members which are necessary for the attachment of the one or more oil pressure hoses becomes able to be reduced.

The 4$^{th}$ aspect of the present invention is a vehicle according to the 2$^{nd}$ aspect of the present invention, wherein the step is, via a vehicle side attaching frame for attaching the step, which is provided at a side of the vehicle main body, attached to a frame body which configures a cabin, and a fuel tank supporting frame for supporting the one or more fuel tanks is attached to a transmission case for transmitting motive power from the engine.

By means of this, since the step is attached to the frame body which configures the cabin, the structure of the frame body which configures the cabin is used, and sufficient supporting strength of the step becomes able to be guaranteed.

In addition, by means of this, since the fuel tank supporting frame is attached to the transmission case, the structure of the transmission case is used, and the manufacturing process becomes able to be simplified.

By the present invention, a vehicle can be furnished which is able to realize attachment of one or more fuel filters to a location other than the engine.

Figure 1:
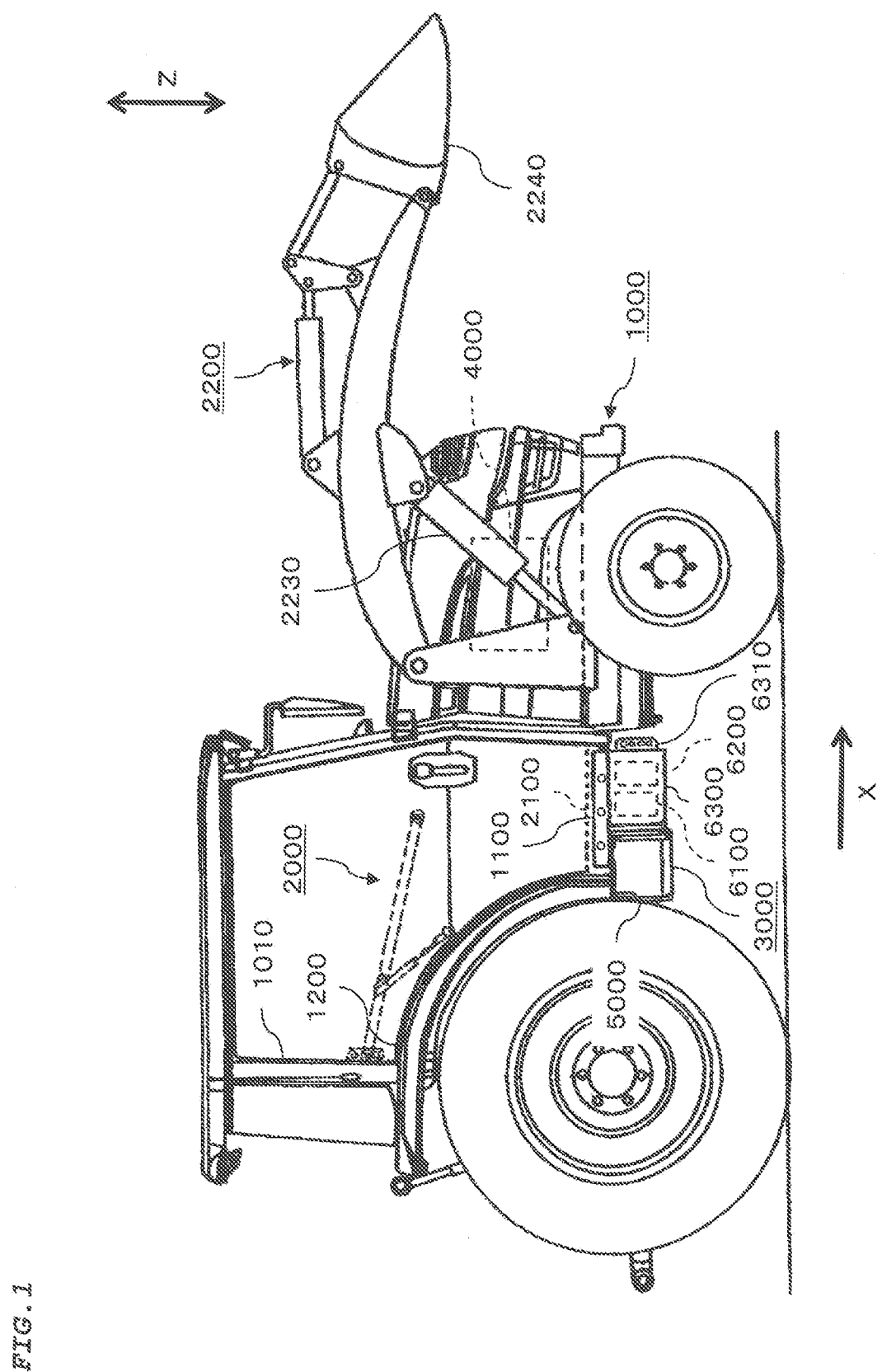
FIG. 1 is a schematic right side view of a tractor of an embodiment in the present invention.

DESCRIPTION OF SYMBOLS 1000 vehicle main body
1010 cabin
1100 vehicle side attaching frame
1200 right side rear wheel fender cover
2000 operating seat
2100 operating seat floor
2200 front loader
2211 front loader oil pressure hose
2212 front loader oil pressure hose
2213 front loader oil pressure hose
2214 front loader oil pressure hose
2220 front loader oil pressure valve
2230 front loader oil pressure cylinder
2240 bucket
2250 front loader operating lever
3000 right side step
3001 welding part
3002 welding part
3003 bolt hole
3004 bolt hole
3005 bolt hole
4000 common rail type engine
4100 transmission case
5000 fuel tank
5100 fuel tank supporting frame
6100 pre-fuel filter
6101 bolt
6200 main fuel filter
6210 fuel filter cover holding frame
6211 welding part
6212 welding part
6213 bolt hole
6214 bolt hole
6215 bolt hole
6300 fuel filter cover
6301 bolt
6302 bolt
6303 bolt
6304 bolt
6305 bolt
6310 front loader oil pressure hose attaching part
6320 fuel filter cover lower part plate
6321 butterfly nut
6322 butterfly nut

PREFERRED EMBODIMENTS OF THE INVENTION

In the following, referring to the drawings, descriptions are given in detail regarding embodiments in the present invention and inventions related to the present invention.

Embodiment

In the beginning, referring to FIGS. 1-4, descriptions are given regarding the configuration and action of a tractor of the present embodiment.

Figure 2:
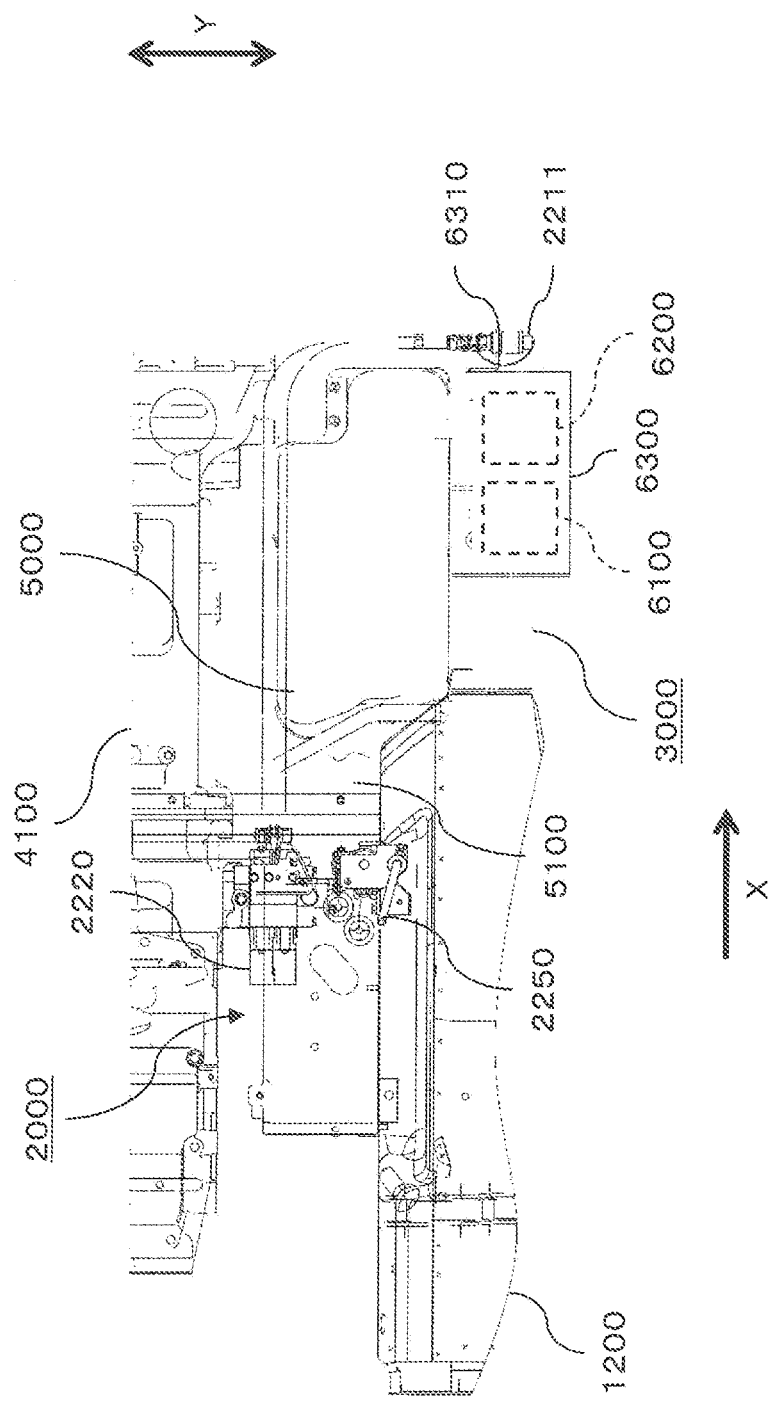
FIG. 2 is a schematic partial top view of a neighborhood of a pre-fuel filter and a main fuel filter of a tractor of an embodiment in the present invention.
Figure 3:
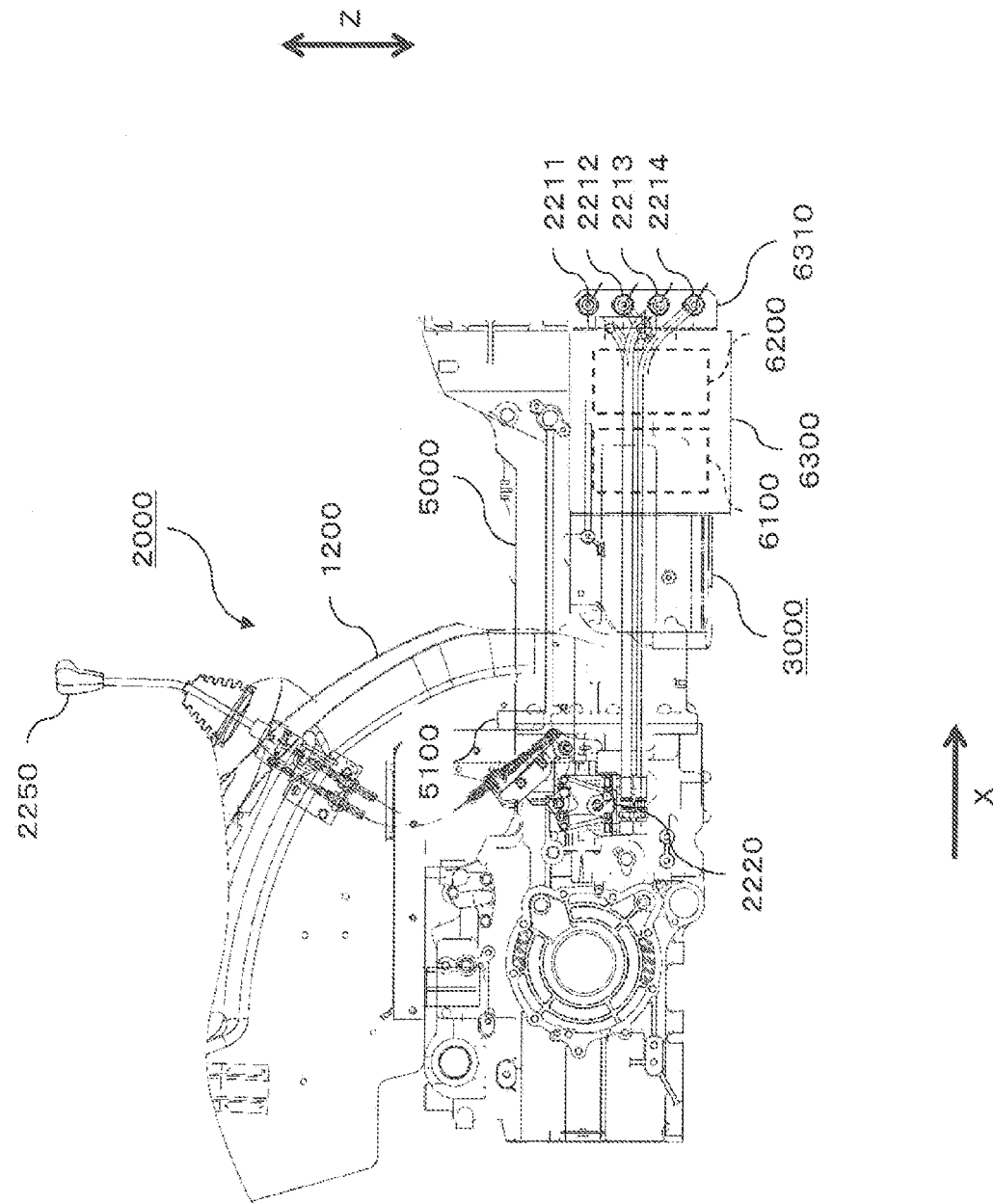
FIG. 3 is a schematic partial right side view of a neighborhood of a pre-fuel filter and a main fuel filter of a tractor of an embodiment in the present invention.
Figure 4:
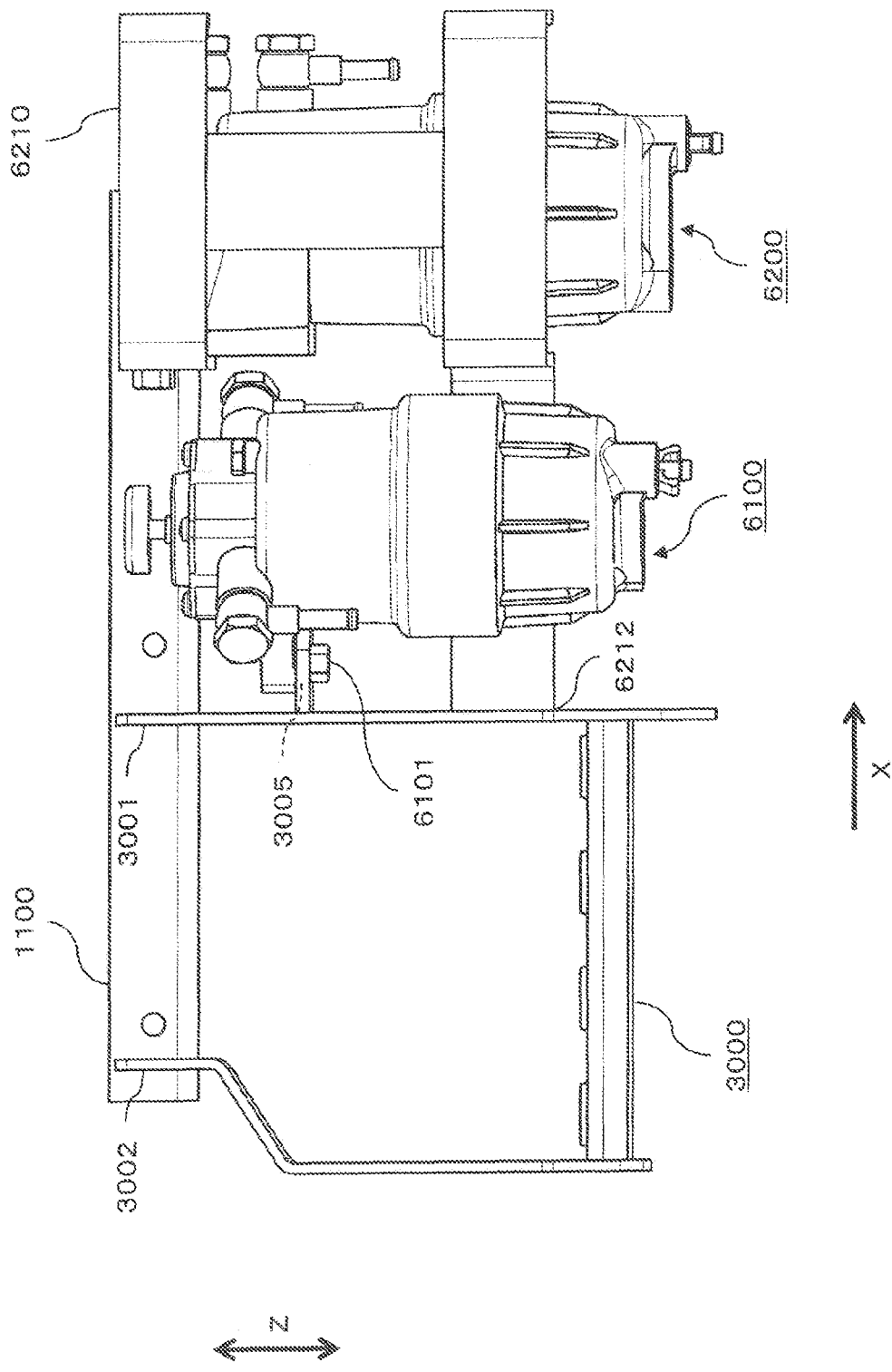
FIG. 4 is a schematic partial enlarged right side view of a neighborhood of a pre-fuel filter and a main fuel filter of a tractor of an embodiment in the present invention.

Here, FIG. 1 is a schematic right side view of the tractor of the embodiment in the present invention, FIG. 2 is a schematic partial top view of a neighborhood of the pre-fuel filter 6100 and the main fuel filter 6200 of the tractor of the embodiment in the present invention, FIG. 3 is a schematic partial right side view of a neighborhood of the pre-fuel filter 6100 and the main fuel filter 6200 of the tractor of the embodiment in the present invention, and FIG. 4 is a schematic partial enlarged right side view of a neighborhood of the pre-fuel filter 6100 and the main fuel filter 6200 of the tractor of the embodiment in the present invention.

Note that with respect to FIGS. 1-3, the fuel filter cover 6300 is attached but that with respect to FIG. 4, the fuel filter cover 6300 is detached.

And, regarding the pathway and so forth through which fuel that is supplied from the fuel tanks 5000 to the common rail type engine 4000 is to pass, specific illustrative showing thereof is omitted (hereinafter the same).

The tractor of the present embodiment comprises: the pre-fuel filter 6100 and the main fuel filter 6200; the operating seat 2000; and the right side step 3000.

And, the pre-fuel filter 6100 and the main fuel filter 6200 are arranged at the position which is placed in front of the right side step 3000 with respect to the forward movement direction of the vehicle main body 1000 which is shown by the arrow X.

In case a configuration is adopted in which the pre-fuel filter 6100 and the main fuel filter 6200 are attached at a front side of the right side step 3000, the number of members which are necessary for the attachment of the pre-fuel filter 6100 and the main fuel filter 6200 can be reduced, and the maintenance also becomes easy.

Of course, a configuration may be adopted in which the pre-fuel filter 6100 and the main fuel filter 6200 are attached only to the right side step 3000 and, in case a configuration like that is adopted, even when the tractor is of large size, the maintenance of the pre-fuel filter 6100 and the main fuel filter 6200 is easily implemented, so that the convenience can be improved.

Additionally, the tractor of the present embodiment is an example of the vehicle of the present invention.

In addition, the vehicle main body 1000 is an example of the vehicle main body of the present invention.

The pre-fuel filter 6100 and the main fuel filter 6200 are filters through which fuel that is supplied from the fuel tanks 5000 to the common rail type engine 4000 is to pass.

In case a configuration is adopted in which the pre-fuel filter 6100 and the main fuel filter 6200 are attached, foreign matters such as particles and so forth which are contained in the fuel are more securely removed with the two fuel filters used, and the quality of the fuel which is supplied to the common rail type engine 4000 can be improved.

Additionally, the pre-fuel filter 6100 is an example of the pre-filter of the present invention. In addition, the main fuel filter 6200 is an example of the main filter of the present invention.

In addition, the fuel tanks 5000 are examples of the one or more fuel tanks of the present invention.

In addition, the common rail type engine 4000 is an example of the engine of the present invention.

The operating seat 2000 is an operating seat in which a worker is to perform operation for activating the tractor, a working implement, which is installed on the tractor, and so forth.

In the present embodiment, as a working implement the front loader 2200 is installed at a front side of the vehicle main body 1000.

More specifically, the tractor comprises the front-and-rear wheels of the left-and-right sides and if operation of the front loader operating lever 2250, which is provided in a neighborhood of the right side rear wheel fender cover 1200 that covers the rear wheel of the right side, is performed by a worker, the front loader oil pressure cylinder 2230 which is joined to the front loader oil pressure valve 2220 via the front loader oil pressure hoses 2211, 2212, 2213 and 2214 acts in response to the said operation, so that the whole of the front loader 2200 and the bucket 2240 are allowed to ascend/descend.

In case a configuration is adopted in which the front loader operating lever 2250 is provided in a neighborhood of the right side rear wheel fender cover 1200, a worker is to easily perform operation with his or her dominant arm, and the operability of the front loader 2200 can be improved.

And, in case a configuration is adopted in which the front loader oil pressure valve 2220 is provided at a lower place compared with the front loader operating lever 2250 with respect to the up-and-down direction that is shown by the bidirectional arrow Z, the front loader oil pressure valve 2220 is easily arranged so that the distance from the front loader operating lever 2250 becomes short, and the layout characteristic of members can be improved.

Additionally, the operating seat 2000 is an example of the operating seat of the present invention.

In addition, the front loader 2200 is an example of the front loader of the present invention.

The right side step 3000 is a step for the worker getting into the operating seat 2000, which is provided at a right side with respect to the forward movement direction of the vehicle main body 1000 which is shown by the arrow X.

Additionally, the right side step 3000 is an example of the step of the present invention.

That is, the step of the present invention is arranged at least at a side where the one or more fuel filters of the present invention are positioned, and the one or more fuel filters of the present invention are arranged at a position which is placed at a right side or a left side of the one or more fuel tanks of the present invention with respect to the forward movement direction of the vehicle main body. And, it is desirable that the one or more fuel filters of the present invention be arranged at a position which is placed in front of the step of the present invention with respect to the forward movement direction of the vehicle main body.

The pre-fuel filter 6100 and the main fuel filter 6200 are covered by the fuel filter cover 6300.

In case a configuration is adopted in which the fuel filter cover 6300 is provided that covers the pre-fuel filter 6100 and the main fuel filter 6200, the pre-fuel filter 6100 and the main fuel filter 6200 can be protected from stones, mud and so forth.

On the fuel filter cover 6300, the front loader oil pressure hose attaching part 6310 is provided.

The front loader oil pressure hose attaching part 6310 is an attaching part of the front loader oil pressure hoses 2211, 2212, 2213 and 2214 for activating the front loader 2200.

More specifically, the front loader oil pressure hose 2211 is an oil pressure hose for allowing the whole of the front loader 2200 to descend, the front loader oil pressure hose 2212 is an oil pressure hose for allowing the whole of the front loader 2200 to ascend, the front loader oil pressure hose 2213 is an oil pressure hose for allowing the bucket 2240 to ascend, and the front loader oil pressure hose 2214 is an oil pressure hose for allowing the bucket 2240 to descend.

In case a configuration is adopted in which the front loader oil pressure hose attaching part 6310 is provided on the fuel filter cover 6300, the number of members which are necessary for the attachment of the front loader oil pressure hoses 2211, 2212, 2213 and 2214 can be reduced.

And, in case a configuration is adopted in which the attachment of the front loader oil pressure hoses 2211, 2212, 2213 and 2214 can be perform along an up-and-down line with respect to the up-and-down direction that is shown by the bidirectional arrow Z, the front loader oil pressure hoses 2211, 2212, 2213 and 2214 are easily arranged with good efficiency, and the layout characteristic of members can be improved.

Additionally, the front loader oil pressure hose attaching part 6310 is an example of the attaching part of the present invention.

In addition, the front loader oil pressure hoses 2211, 2212, 2213 and 2214 are examples of the one or more oil pressure hoses of the present invention.

The fuel tanks 5000 are arranged at the position which is placed at an inner side of the vehicle main body 1000 compared with the right side step 3000, and is placed below the operating seat floor 2100 the operating seat 2000 has.

In case a configuration is adopted in which the fuel tanks 5000 are arranged at an inner side compared with the right side step 3000 and below the operating seat floor 2100, room that is being vacant space can be effectively used.

As will be described later, by a configuration in which the fuel tanks 5000 are provided in a left-and-right pair with respect to the left-and-right direction that is shown by the bidirectional arrow Y, the amount of the fuel which is able to be loaded onto the tractor is increased, and the left-and-right balance property of the machine body can be improved as well.

Additionally, the operating seat floor 2100 is an example of the floor-face of the present invention.

A specific example of the "right side with respect to the forward movement direction of the vehicle main body" of the present invention is a vehicle width direction right side of the vehicle, and a specific example of the "front side with respect to the forward movement direction of the vehicle main body" of the present invention is a front-and-rear direction front side of the vehicle.

The front-and-rear direction is the front-and-rear direction of the tractor and so forth.

Namely, the front-and-rear direction is the movement direction on the occasion when the tractor moves straight on, the movement direction frontward side is said to be the front-and-rear direction front side, and the movement direction rearward side is said to be the front-and-rear direction rear side.

The movement direction of the tractor is the direction from the operating seat of the tractor toward the steering handle at the time when the tractor moves straight on, the steering handle side becomes the front side, and the operating seat side becomes the rear side.

The vehicle width direction is the direction which is orthogonal to the front-and-rear direction in a horizontal face.

The right side in a state where the front-and-rear direction front side is viewed is said to be the vehicle width direction right side, and the left side in a state where the front-and-rear direction front side is viewed is said to be the vehicle width direction left side.

The vertical direction is the direction which is orthogonal to the front-and-rear direction and the vehicle width direction.

Therefore, the front-and-rear direction, the vehicle width direction and the vertical direction are orthogonal to each other.

Figure 5B:
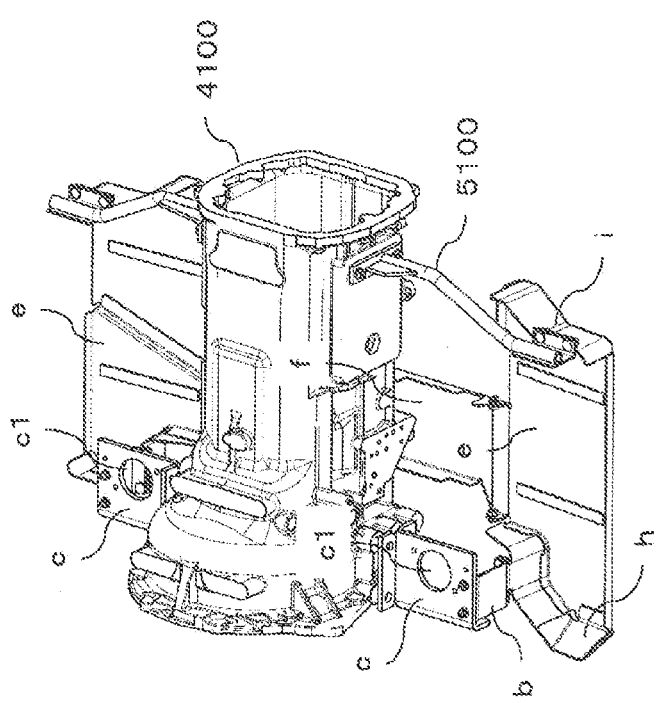
FIG. 5B is a schematic partial enlarged perspective view (No. 2) of a neighborhood of a transmission case of a tractor of an embodiment in the present invention.
Figure 5A:
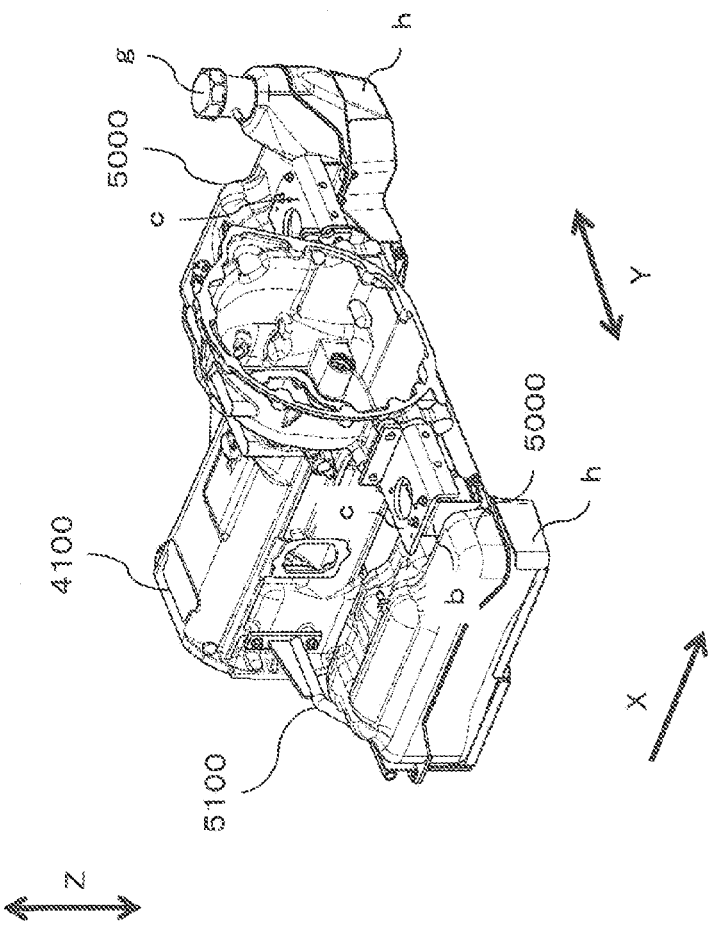
FIG. 5A is a schematic partial enlarged perspective view (No. 1) of a neighborhood of a transmission case of a tractor of an embodiment in the present invention.

Next, mainly referring to FIGS. 5A and 5B, descriptions are more specifically given regarding the configuration and action of the tractor of the present embodiment.

Here, FIGS. 5A and 5B are schematic partial enlarged perspective views (No. 1 and No. 2) of a neighborhood of the transmission case 4100 of the tractor of the embodiment in the present invention.

Note that with respect to FIG. 5B, the fuel tanks 5000 are detached.

The fuel tank supporting frame 5100 for supporting the fuel tanks 5000 is attached to the transmission case 4100 for transmitting motive power from the common rail type engine 4000. The fuel tank supporting frame 5100 supports the rear part side of the fuel tanks 5000.

In case a configuration is adopted in which the fuel tank supporting frame 5100 is joined to the transmission case 4100, the manufacturing process is simplified, and sufficient supporting strength of the fuel tank supporting frame 5100 can be guaranteed as well.

Of course, a configuration may be adopted in which the fuel tank supporting frame 5100 is joined to the right side step 3000 that is attached to the vehicle side attaching frame 1100 and, in case a configuration like that is adopted, sufficient supporting strength of the fuel tank supporting frame 5100 can be more securely guaranteed.

Additionally, the fuel tank supporting frame 5100 is an example of the fuel tank supporting frame of the present invention.

In addition, the transmission case 4100 is an example of the transmission case of the present invention.

The configuration of the neighborhood of the transmission case 4100 is roughly of left-and-right symmetry.

The front side of the fuel tanks 5000 made of resin, for example, which are disposed on the plates e is attached to the transmission case 4100 via the plates b and c.

The plate f is a cover which covers a lower place of the joining pipe (not shown) that joins the fuel tanks 5000 of the left-and-right sides.

The plates h and i are plates which regulate the positions of the front side and rear side of the fuel tanks 5000, respectively.

The refueling cap g is provided at the fuel tank 5000 of the left side.

The hole parts c1 of the plates c, at which the dampers (not shown) for vibration absorption are provided, are equipped with the front side of the cabin 1010.

In the equipping configuration of the cabin 1010 and the supporting configuration of the fuel tanks 5000, the plates c are used in common, and the number of components is reduced.

Next, mainly referring to FIGS. 6-11, descriptions are still more specifically given regarding the configuration and action of the tractor of the present embodiment.

Here, FIGS. 6-11 are schematic partial enlarged perspective views (Nos. 1-6) of a neighborhood of the pre-fuel filter 6100 and the main fuel filter 6200 of the tractor of the embodiment in the present invention.

Figure 6:
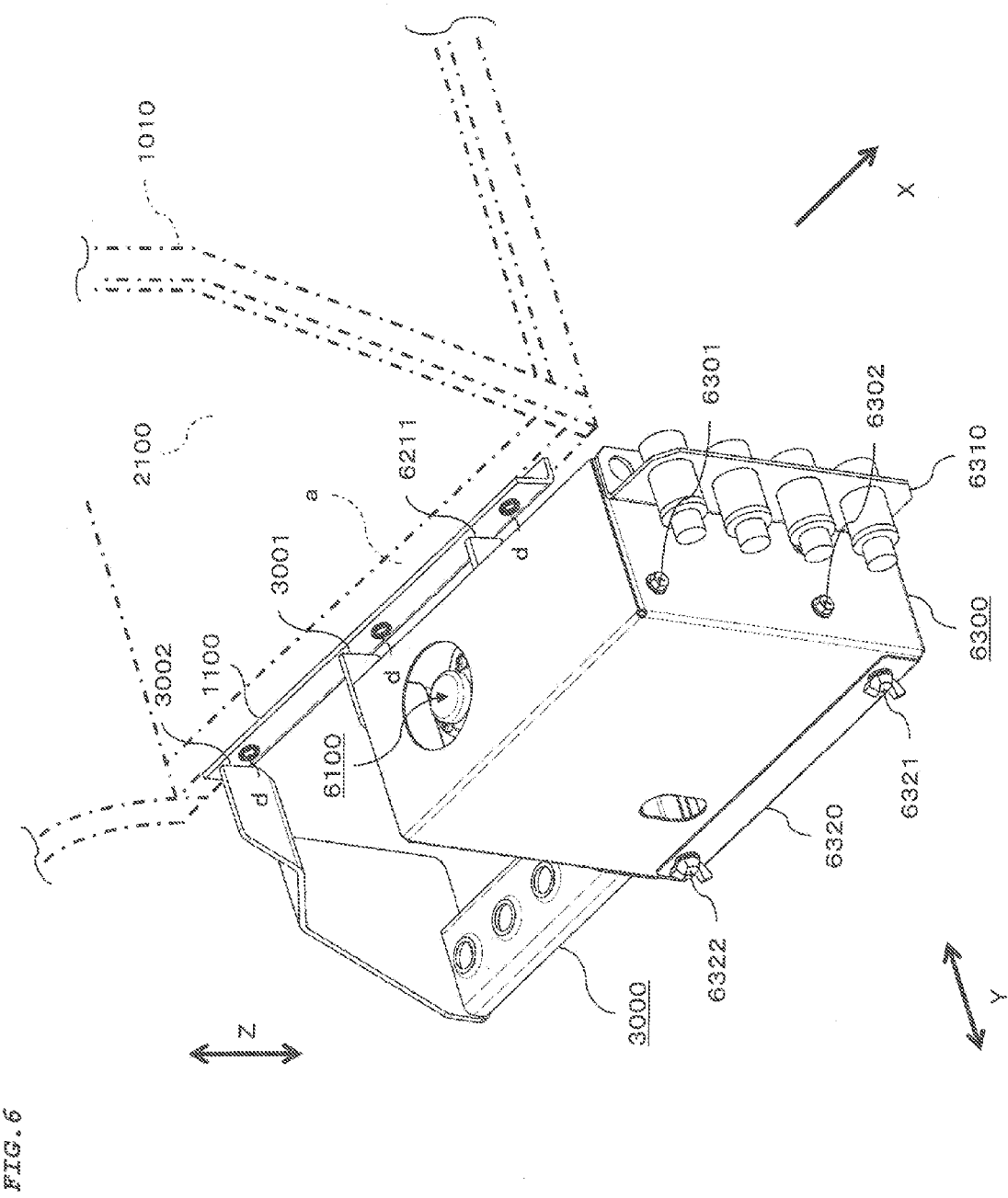
FIG. 6 is a schematic partial enlarged perspective view (No. 1) of a neighborhood of a pre-fuel filter and a main fuel filter of a tractor of an embodiment in the present invention.
Figure 7:
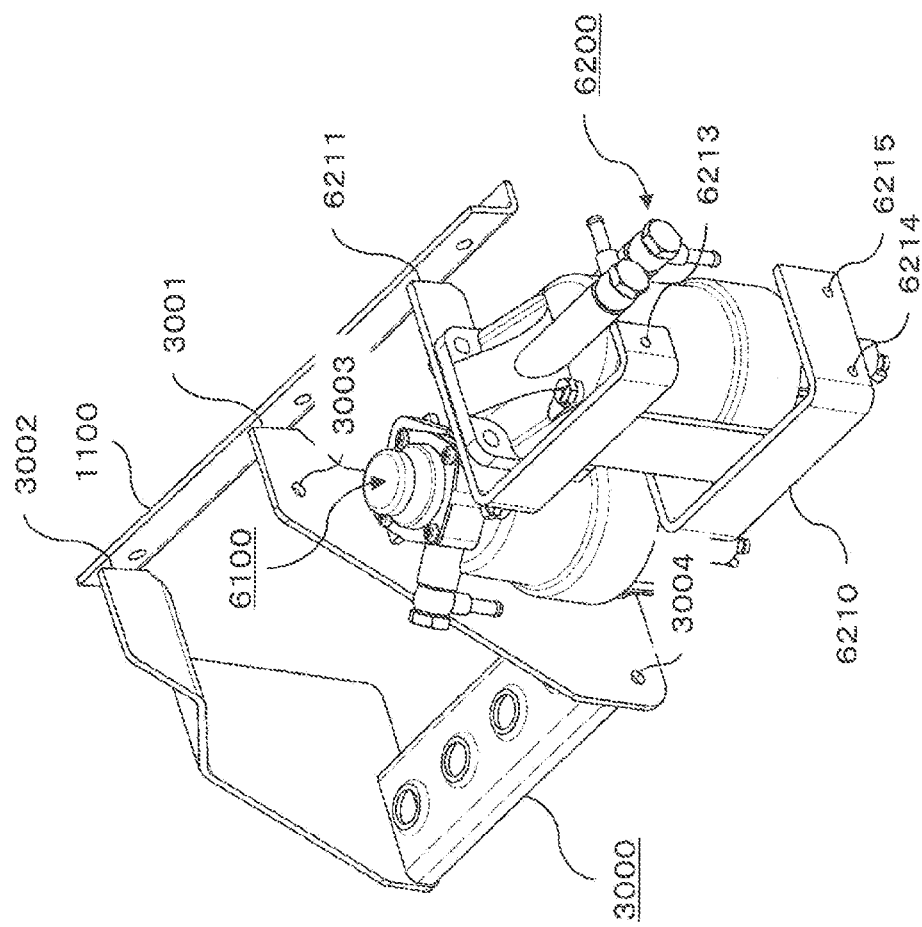
FIG. 7 is a schematic partial enlarged perspective view (No. 2) of a neighborhood of a pre-fuel filter and a main fuel filter of a tractor of an embodiment in the present invention.
Figure 8:
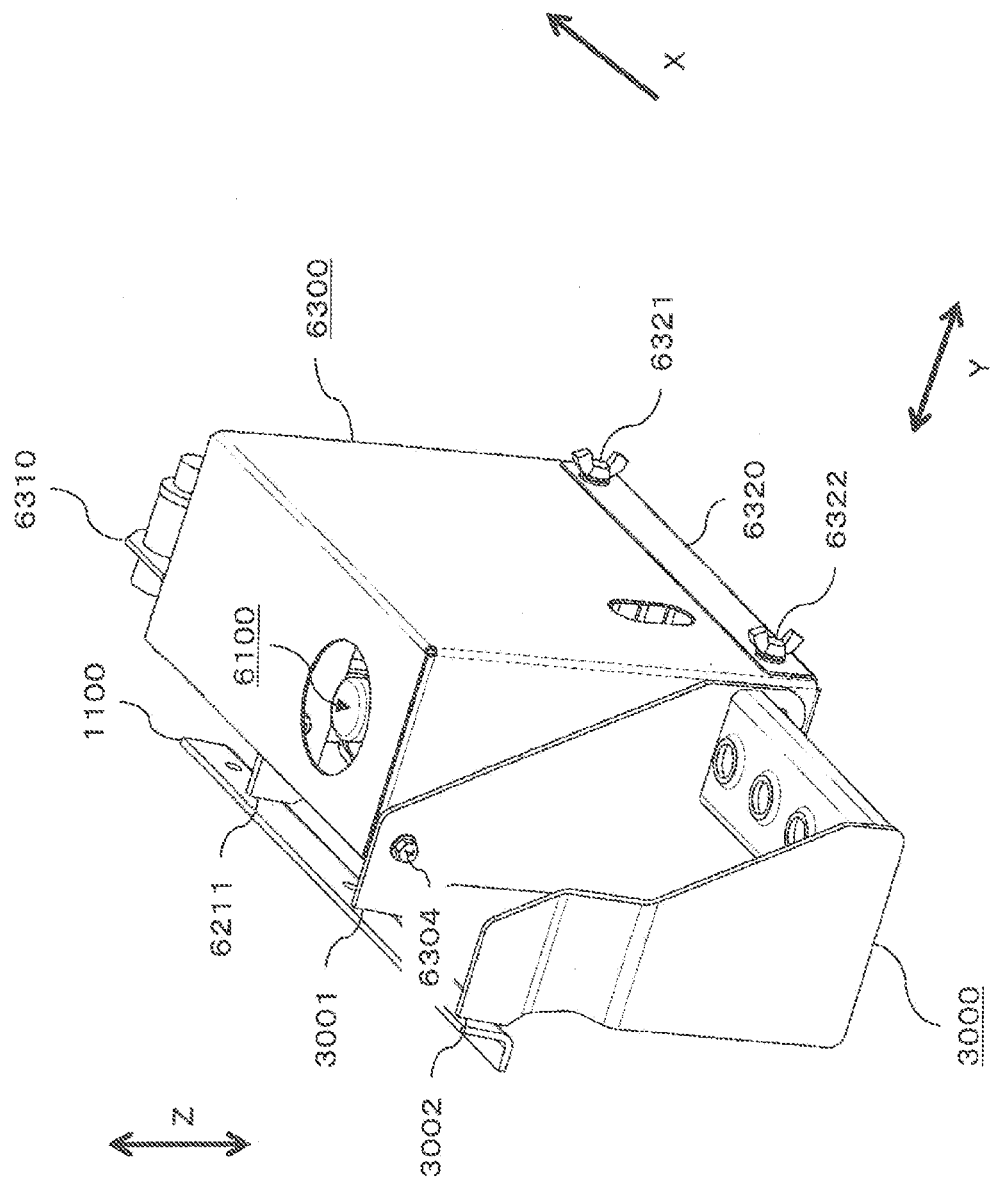
FIG. 8 is a schematic partial enlarged perspective view (No. 3) of a neighborhood of a pre-fuel filter and a main fuel filter of a tractor of an embodiment in the present invention.
Figure 9:
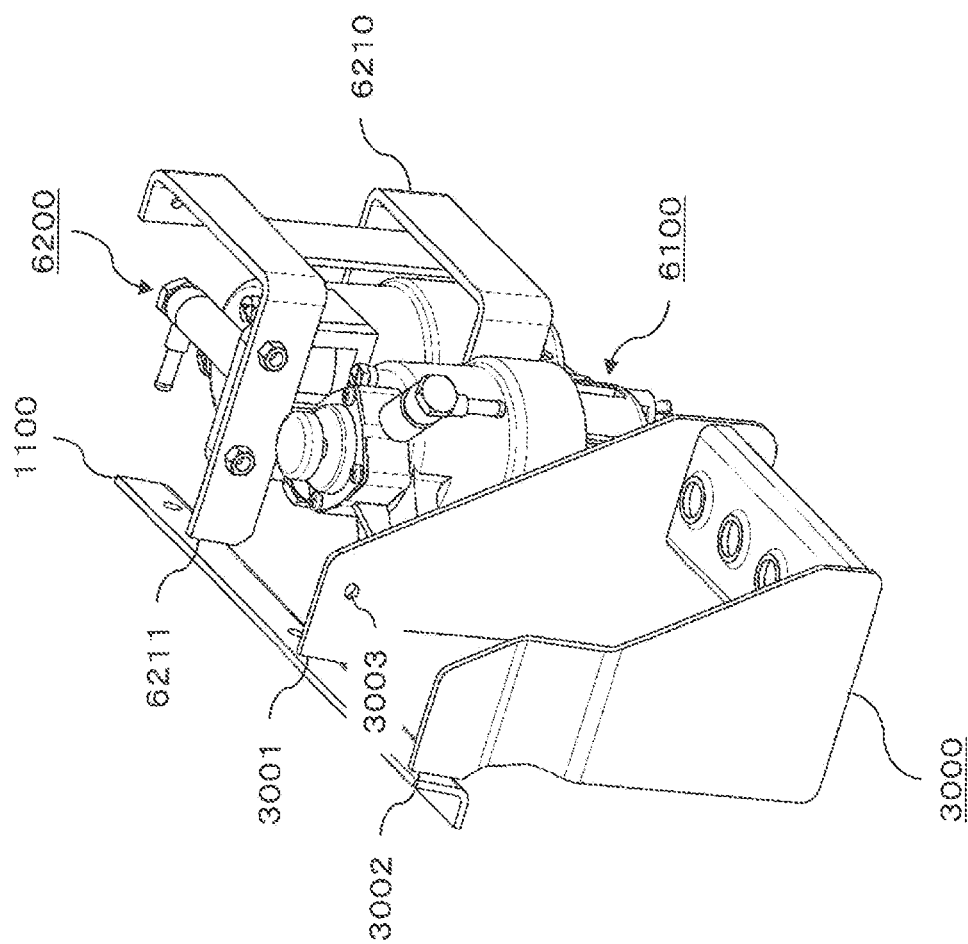
FIG. 9 is a schematic partial enlarged perspective view (No. 4) of a neighborhood of a pre-fuel filter and a main fuel filter of a tractor of an embodiment in the present invention.
Figure 10:
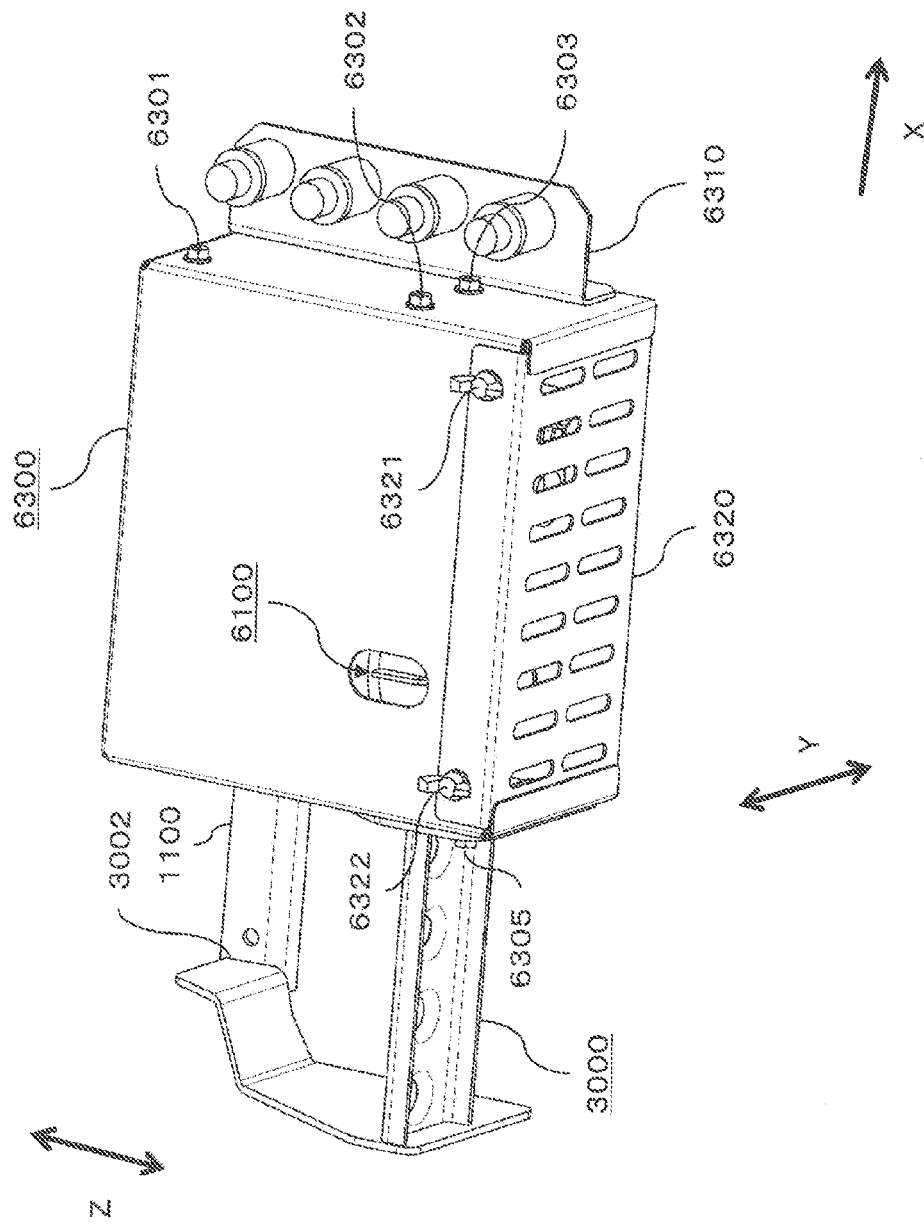
FIG. 10 is a schematic partial enlarged perspective view (No. 5) of a neighborhood of a pre-fuel filter and a main fuel filter of a tractor of an embodiment in the present invention.
Figure 11:
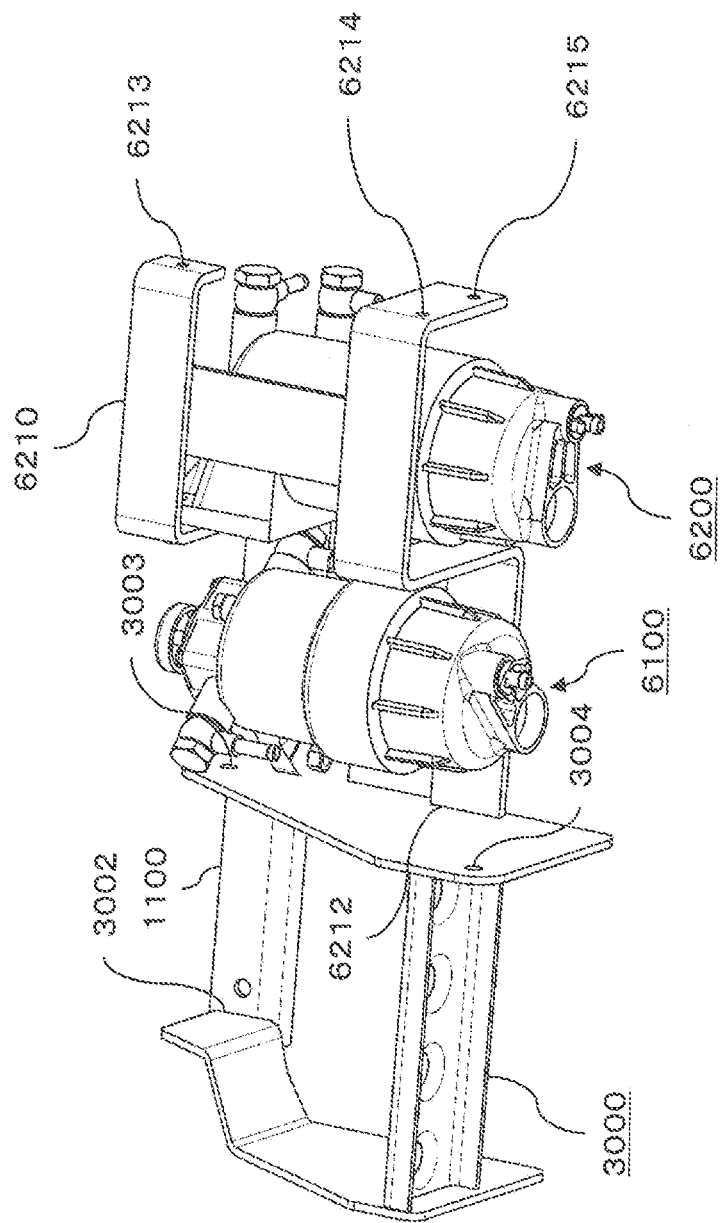
FIG. 11 is a schematic partial enlarged perspective view (No. 6) of a neighborhood of a pre-fuel filter and a main fuel filter of a tractor of an embodiment in the present invention.

Note that with respect to FIGS. 6, 8 and 10, the fuel filter cover 6300 is attached but that with respect to FIGS. 7, 9 and 11, the fuel filter cover 6300 is detached.

And, with respect to FIGS. 6 and 7 the neighborhood of the pre-fuel filter 6100 and the main fuel filter 6200 is observed from the right frontward upside of the tractor of the present embodiment, with respect to FIGS. 8 and 9 the neighborhood of the pre-fuel filter 6100 and the main fuel filter 6200 is observed from the right rearward upside of the tractor of the present embodiment, and with respect to FIGS. 10 and 11 the neighborhood of the pre-fuel filter 6100 and the main fuel filter 6200 is observed from the right frontward downside of the tractor of the present embodiment.

The right side step 3000 is, via the vehicle side attaching frame 1100, attached to the frame body a which configures the cabin 1010.

More specifically, the right side step 3000 is joined to the vehicle side attaching frame 1100 with the welding parts 3001 and 3002 used.

And, the vehicle side attaching frame 1100 is fixed with the bolts d to the frame body a which is a frame of the right side of the operating seat floor 2100.

Additionally, the vehicle side attaching frame 1100 is an example of the vehicle side attaching frame of the present invention.

In addition, the cabin 1010 is an example of the cabin of the present invention. In addition, the frame body a is an example of the frame body of the present invention.

The pre-fuel filter 6100 is attached to the right side step 3000.

More specifically, the pre-fuel filter 6100 is joined to the right side step 3000 with the bolt 6101 and the bolt hole 3005, into which this is screwed, used.

It is desirable that the main fuel filter 6200 be attached, directly or indirectly, to at least one of the vehicle side attaching frame 1100 and the right side step 3000.

In the present embodiment, the main fuel filter 6200 is attached to the fuel filter cover holding frame 6210 which is attached to the vehicle side attaching frame 1100.

Since, by attaching/detaching the vehicle side attaching frame 1100 to/from the frame body a, the right side step 3000, the pre-fuel filter 6100, the main fuel filter 6200 and the fuel filter cover holding frame 6210 can be integrally attached to or detached from the vehicle main body 1000, the maintenance becomes easy.

And, the fuel filter cover 6300 is attached to the fuel filter cover holding frame 6210.

More specifically, the upside of the fuel filter cover holding frame 6210 is joined to the vehicle side attaching frame 1100 with the welding part 6211 used, and the downside of the fuel filter cover holding frame 6210 is joined also to the right side step 3000 with the welding part 6212 used as well.

Further, the front side of the fuel filter cover 6300 is joined to the fuel filter cover holding frame 6210 with the bolts 6301, 6302 and 6303, and the bolt holes 6213, 6214 and 6215, into which these are screwed, used, and the rear side of the fuel filter cover 6300 is joined also to the right side step 3000 with the bolts 6304 and 6305, and the bolt holes 3003 and 3004, into which these are screwed, used as well.

Furthermore, the fuel filter cover 6300 possesses the fuel filter cover lower part plate 6320 which can be allowed, by unfastening the butterfly nuts 6321 and 6322, to slide with respect to the left-and-right direction that is shown by the bidirectional arrow Y.

In case a configuration is adopted in which the fuel filter cover lower part plate 6320 that can be allowed to slide is provided, the maintenance of the pre-fuel filter 6100 and the main fuel filter 6200 is easily implemented, and the convenience can be improved.

Additionally, the fuel filter cover 6300 is an example of the cover of the present invention.

In addition, the fuel filter cover holding frame 6210 is an example of the cover holding frame of the present invention.

In the above, detailed descriptions have been given regarding the configuration and action of the tractor of the present embodiment.

Now, if the one or more fuel filters (the pre-fuel filter 6100 and the main fuel filter 6200) are arranged at a front side of the right side substep (the right side step 3000) as described above, with vacant space being exploited, the plural fuel filters become able to be attached.

However, the size of the vacant space like that is limited.

Hereupon, the present inventors consider that, in order to amply exploit the vacant space, it is necessary to further push on with the reduction of the number of components in the configuration of the neighborhood of the pre-fuel filter 6100 and the main fuel filter 6200.

Hereupon, in what follows, specific descriptions are given regarding the reduction of the number of components in the configuration of the neighborhood of the pre-fuel filter 6100 and the main fuel filter 6200.

(1) A configuration is considered in which a filter stay for joining, with the bolt 6101 and the bolt hole 3005, into which this is screwed, used, the pre-fuel filter 6100 to the right side step 3000 is provided integrally with the right side step 3000.

For example, bolt holes into which bolts for attaching the filter stay to the right side step 3000 are screwed may be, in such a way that the position of the pre-fuel filter 6100 can be adjusted with respect to the up-and-down direction which is shown by the bidirectional arrow Z, provided at two or more spots of the right side step 3000 regarding the up-and-down direction.

Of course, it goes without saying that, corresponding to this, bolt holes into which bolts for attaching the main fuel filter 6200 to a plate are screwed may be provided at two or more spots of the plate regarding the up-and-down direction, in such a way that the position of the main fuel filter 6200 can be adjusted with respect to the up-and-down direction, with the size of the plate for attaching the main fuel filter 6200 to the fuel filter cover holding frame 6210 which is joined to the vehicle side attaching frame 1100 with the welding part 6211 used being allowed to be larger with respect to the up-and-down direction.

Then, for example, since by adjusting the attaching positions of the pre-fuel filter 6100 and the main fuel filter 6200 the heights of these can be changed, the raising amount of the mower deck which is installed between the front wheels and the rear wheels becomes able to be sufficiently ensured.

(2) A configuration is considered in which the fuel filter cover 6300 is provided integrally with the right side step 3000.

For example, the fuel filter cover 6300 may be configured so as to be divided into the fuel filter cover lower part plate 6320 and a base part as a filter bracket which is integrated with the right side step 3000, in such a way that the fuel filter cover lower part plate 6320 can be allowed, by unfastening the butterfly nuts 6321 and 6322, to slide with respect to the left-and-right direction which is shown by the bidirectional arrow Y.

Then, for example, since the fuel filter cover lower part plate 6320 can be allowed to slide and detached even if the base part is integrated with the right side step 3000, the maintenance of the pre-fuel filter 6100 and the main fuel filter 6200 becomes able to be implemented with ease through the opening part of the downside, as being described above.

Of course, it goes without saying that at the base part, the front loader oil pressure hose attaching part 6310 and so forth may be provided.

A vehicle in the present invention is able to realize attachment of one or more fuel filters to a location other than the engine, and is useful for an objective of utilization as a work vehicle and so forth like a vehicle for agriculture such as a tractor and so forth.

What is claimed is:

1. A vehicle comprising:
   one or more fuel filters through which fuel that is supplied from one or more fuel tanks to an engine is to pass; and
   an operating seat in which a worker is to perform operation for activating the vehicle and a working implement that is installed on the vehicle, wherein
   the one or more fuel tanks are arranged at a position which is placed below a floor-face the operating seat has,
   the engine is arranged at a position which is placed in front of the operating seat with respect to a forward movement direction of a vehicle main body,
   the one or more fuel filters are arranged at a position which is placed at a right side or a left side of the one or more fuel tanks with respect to the forward movement direction of the vehicle main body, and
   the one or more fuel filters are covered by a cover on which an attaching part of one or more oil pressure hoses for activating a front loader is provided.

2. A vehicle comprising:
   one or more fuel filters through which fuel that is supplied from one or more fuel tanks to an engine is to pass;
   an operating seat in which a worker is to perform operation for activating the vehicle and a working implement that is installed on the vehicle; and
   a step for the worker getting into the operating seat, wherein
   the one or more fuel tanks are arranged at a position which is placed below a floor-face the operating seat has,
   the engine is arranged at a position which is placed in front of the operating seat with respect to a forward movement direction of a vehicle main body,
   the one or more fuel filters are arranged at a position which is placed at a right side or a left side of the one or more fuel tanks with respect to the forward movement direction of the vehicle main body,
   the step is arranged at least at a side where the one or more fuel filters are positioned,
   the one or more fuel filters are arranged at a position which is placed in front of the step with respect to the forward movement direction of the vehicle main body,
   the step is, via a vehicle side attaching frame for attaching the step, which is provided at a side of the vehicle main body, attached to a frame body which configures a cabin, and
   a fuel tank supporting frame for supporting the one or more fuel tanks is attached to a transmission case for transmitting motive power from the engine.

* * * * *